US010585454B2

(12) United States Patent
Yuen et al.

(10) Patent No.: US 10,585,454 B2
(45) Date of Patent: Mar. 10, 2020

(54) OUTER CASES FOR COMPUTING DEVICES

(71) Applicant: HEWLETT-PACKARD DEVELOPMENT COMPANY, L.P., Houston, TX (US)

(72) Inventors: Hang Yan Yuen, Fort Collins, CO (US); Paul Howard Mazurkiewicz, Fort Collins, CO (US); Hui He, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,117

(22) PCT Filed: Jul. 22, 2016

(86) PCT No.: PCT/US2016/043587
§ 371 (c)(1),
(2) Date: Oct. 8, 2018

(87) PCT Pub. No.: WO2018/017124
PCT Pub. Date: Jan. 25, 2018

(65) Prior Publication Data
US 2019/0129468 A1    May 2, 2019

(51) Int. Cl.
*G06F 1/16*        (2006.01)
*G06F 1/20*        (2006.01)
(Continued)

(52) U.S. Cl.
CPC .......... *G06F 1/1628* (2013.01); *A45C 13/02* (2013.01); *A45F 3/04* (2013.01); *G06F 1/163* (2013.01); *G06F 1/20* (2013.01); *G06F 1/203* (2013.01); *A45C 2013/025* (2013.01); *A45F 2003/003* (2013.01); *A45F 2200/0525* (2013.01); *G06F 2200/201* (2013.01)

(58) Field of Classification Search
None
See application file for complete search history.

(56) References Cited

U.S. PATENT DOCUMENTS 6,304,459 B1 * 10/2001 Toyosato ................ G06F 1/163
312/208.4
6,819,559 B1   11/2004 Seeger et al.
(Continued)

FOREIGN PATENT DOCUMENTS

EP    0962853 A1    8/1999
EP    1148419       10/2001

OTHER PUBLICATIONS

"The HIVE".
(Continued)

*Primary Examiner* — Xanthia C Cunningham
(74) *Attorney, Agent, or Firm* — Trop, Pruner & Hu PC

(57) ABSTRACT

In some examples, a wearable system includes an outer case defining an inner chamber and comprising a portion including a liquid resistant and breathable layer. The wearable system further includes a computing device in the inner chamber, and an airflow generator to produce an airflow to cool the computing device and to direct a resulting heated airflow to flow through pores of the liquid resistant and breathable layer to an environment outside the outer case.

20 Claims, 5 Drawing Sheets

(51) Int. Cl.
*A45F 3/04* (2006.01)
*A45C 13/02* (2006.01)
*A45F 3/00* (2006.01)

(56) References Cited

U.S. PATENT DOCUMENTS

| | | |
|---|---|---|
| 7,301,648 B2 | 11/2007 | Foxlin |
| 8,651,964 B2 | 2/2014 | Brick |
| 2007/0132785 A1 | 6/2007 | Ebersole et al. |
| 2010/0116860 A1* | 5/2010 | Tello .................. A45F 3/04 224/576 |
| 2015/0303503 A1 | 10/2015 | Winand |
| 2017/0172227 A1* | 6/2017 | Fan ................ A41D 13/0025 |
| 2018/0162626 A1* | 6/2018 | Munie ................ B65D 25/18 |
| 2018/0255636 A1* | 9/2018 | Seo .................... H05K 3/12 |
| 2018/0317572 A1* | 11/2018 | Guttman ............. A41D 27/28 |

OTHER PUBLICATIONS

"Zotac teases tetherfree VR gaming using a Zbox mini-PC stuffed into a backpack", Apr. 22, 2016.

Callaham, J., "MSI to show off a 'Backpack PC' for portable VR gaming at Computex", May 26, 2016.

VR Gaming Backpack Concept from Aorusces 2016.

\* cited by examiner

OUTER CASES FOR COMPUTING DEVICES

BACKGROUND

Users can use various different computing devices to perform computing tasks. Examples of computing devices include desktop computers, notebook computers, handheld devices, wearable devices, and so forth.

BRIEF DESCRIPTION OF THE DRAWINGS

Some implementations of the present disclosure are described with respect to the following figures.

DETAILED DESCRIPTION

Figure 1:
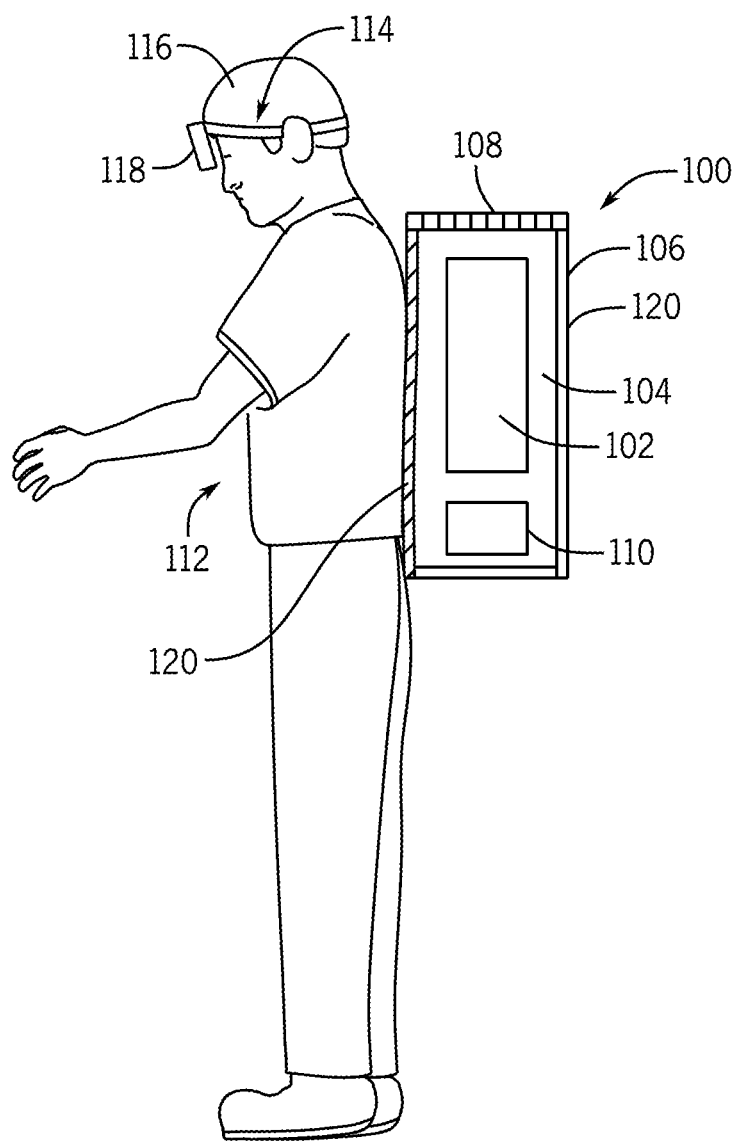
FIG. 1 is a schematic diagram of a wearable system that can be worn by a user, according to some examples.

Certain computing tasks, such as virtual reality (VR) sessions, gaming sessions, or other computing tasks, are processing intensive. In a VR session, a computer environment that simulates a real environment is generated. A user's presence in the environment is also simulated. User gestures can be recognized as inputs to cause respective actions to be performed in the VR session. In a gaming session, high resolution graphical images are generated, and rapid responses are made in response to user inputs to control the game.

To achieve an acceptable level of performance from the perspective of users, processing intensive computing tasks are executed on relatively powerful computing devices, such as desktop computers or other computers with high performance processors and/or graphics cards. However, such high-performance computers can be bulky and may not allow for an immersive experience where a user can freely move around as the user is engaged in a computing session such as a VR session or gaming session.

In some examples, smaller wearable devices, such as head-mounted devices or other body-mounted devices, smart watches, and the like, allow for enhanced mobility of a user as the user is engaged in a computing session. However, such smaller wearable devices have reduced processing capabilities that may be insufficient for certain processing intensive computing tasks. To allow a head-mounted device or other wearable device to be used in a processing intensive computing task, the wearable device can be connected, such as by a cable, to a fixed computer with a greater processing capability, such that the wearable device can interact with the computer to perform the processing intensive computing task. However, connecting a wearable device to a computer that is fixed in position can restrict the mobility of the user.

In accordance with some implementations of the present disclosure, a computing device that can interact with a wearable device (such as a head-mounted device, a smart watch, etc.) or any other electronic device, is contained in a portable bag that can be carried by a user as the user is engaged in a computing session. For example, the bag can be in the form of a backpack that can be worn on the back of the user. Alternatively, other types of bags can be used to carry computing devices, such as a bag that has a strap that can be worn on a shoulder of the user, a bag with a handle that can be hand carried, a bag worn on the user's waist, a handbag, and so forth.

The bag containing the computing device allows the user to carry the computing device with the user, so that the mobility of the user is not restricted. In addition, an active cooling solution can be included in the bag to provide cooling of the computing device, such that heat generated by the computing device does not cause discomfort to the user. The active cooling solution includes an airflow generator to generate an airflow, and an exhaust portion including a liquid resistant and breathable layer formed of a specified material including pores through which a heated airflow can exit from inside the bag to an environment outside the bag.

FIG. 1 is a schematic diagram of an example wearable system 100 that can be carried by a user 112. The wearable system 100 includes a bag that has an outer case 106 defining an inner chamber 104 that contains a computing device 102. In examples according to FIG. 1, the wearable system 100 is in the form of a backpack that can be strapped to the back of the user 112. In other examples, other types of bags can be used.

The computing device 102 can include a computer, a processor, a graphics card, a circuit board on which is mounted a processor and/or a graphics card, or any other hardware processing circuit that can perform computer processing.

The outer case 106 has a main housing that can be either formed of a relatively pliable material, or alternatively, can be formed of a rigid material. For example, a pliable material can include a fabric or other type of material. In further examples, a rigid material can include a plastic, a metal, a composite material, or other material.

In addition, the outer case 106 includes an exhaust portion 108, which in the example of FIG. 1 is formed at a top side of the outer case 106 when worn by the user 112. The exhaust portion 108 includes a liquid resistant and breathable layer that is a porous core layer having pores through which air inside the inner chamber 104 can escape. The liquid resistant and breathable layer prevents liquid droplets (such as water droplets) from entering through the exhaust portion 108 into the inner chamber 104.

In some examples, the pores of the liquid resistant and breathable layer of the exhaust portion 108 include small pores that have pore sizes where the average size (e.g., diameter) is in the range of about 0.1 to 100 micrometers, or some range. The small pores are large enough to allow airflow to pass, but small enough to prevent a liquid droplet from passing through the small pores. In some examples, the liquid resistant and breathable layer can be formed of expanded polytetrafluoroethylene (ePTFE). In other examples, the liquid resistant and breathable layer can be formed of a material that includes polyethylene terephthalate (PET) or another type of polymer. In further examples, other types of materials with small pores can be used to implement the liquid resistant and breathable layer of the exhaust portion 108.

More generally, the porous core layer may have any suitable level of porosity. For example, the porosity of the porous core layer that can be used according to some implementations may be at least about 80%; e.g., at least about 85%, about 90%, about 95%, about 96%, about 97%, about 98%, about 99%, or higher. Depending on the context, the percentage in some examples refer to a volume percentage (in other words, given a total volume of the layer, the specified percentage of the layer is formed of pores). Other porosity values are also possible. The porous core layer may have any suitable level of density. For example, the density of the porous core layer in some examples may be less than or equal to about 0.5 grams per cubic centimeter ($g/cm^3$). In other examples, the density can be less than or equal to about 0.4 $g/cm^3$, about 0.3 $g/cm^3$, about 0.2 $g/cm^3$, about 0.1 $g/cm^3$, or lower. Other density values are also possible. The porous core layer may have any suitable thickness. For example, the thickness of the porous core layer in some examples may be in the range of about 5 micrometers to 5 millimeters. Other thickness values are also possible.

An airflow generator 110 is provided inside the inner chamber 104 of the outer case 106. The airflow generator 110 generates an airflow in the inner chamber 104 to cool the computing device 102. The airflow is heated by heat generated by the computing device 102. The airflow generator 110 directs the airflow in an upward direction that causes the heated airflow to exit through the pores of the exhaust portion 108 at the top side of the outer case 106. The heated airflow passes through the pores of the exhaust portion 108 to an environment outside the outer case 106.

More generally, the wearable system 100 includes an active cooling subsystem that includes the airflow generator 110 and the exhaust portion 108 to direct heated airflow through a side of the wearable system 100 that is away from the user 112 that is carrying the wearable system 100. Although FIG. 1 shows the exhaust portion 108 including the liquid resistant and breathable layer at the top side of the outer case 106, it is noted that in other examples, the exhaust portion 108 can be located on a different side of the outer case 106, such as the front side 120 of the outer case 106. Also, in further examples, multiple exhaust portions including respective liquid resistant and breathable layers can be provided at multiple sides of the outer case 106. More generally, a larger portion of the outer case 106 can be formed of a liquid resistant and breathable material to allow a heated airflow inside the outer case 106 to exit through the pores of the liquid resistant and breathable material.

As further shown in FIG. 1, a thermally reflective layer 120 is provided on a side of the outer case 106 that is adjacent the user 112 when the outer case 106 is worn by the user 112. The thermally reflective layer 120 reflects heat generated by the computing device 102 away from the user 112, so that the user 112 does not experience a hot surface on the back of the user 112 as the user is carrying the wearable system 100. The thermally reflective layer 120 can be formed of a metal that reflects infrared (IR) energy. In other examples, the thermally reflective layer 120 can include a metallic-based coating or a ceramic-based coating that is formed on a surface of the outer case 106.

In some examples, the wearable system 100 further includes a head-mounted device 114, which can be worn on the head 116 of the user 112. The head-mounted device 114 includes a display device 118 that is provided in front of the user's eye or eyes. The head-mounted device 114 is communicatively connected to the computing device 102 in the outer case. The communicative connection between the head-mounted device 114 and the computing device 102 can include a wired connection or a wireless connection (such as a BLUETOOTH wireless connection, a near-field communication (NFC) connection, a WI-FI wireless connection, etc.).

The computing device 102 can generate images or video that can be communicated to the head-mounted device 114 for display by the display device 118. In some examples, the images or video can be part of a VR session, a gaming session, or another type of computing task.

Although FIG. 1 shows an example where the wearable system 100 includes the head-mounted device 114, it is noted that in other examples, the wearable system 100 can omit the head-mounted device 114. In such other examples, the computing device 102 in the wearable system 100 can interact with some other electronic device, such as a hand-held device (e.g., a smart phone, a game appliance, a tablet computer, a smart watch, etc.) that can be carried by the user 112.

Additionally, the head-mounted device 114 is an example of a body-mounted device. While the head-mounted device is mounted to the head 116 of the user 112, a body-mounted device can more generally be mounted to a different part of the user 112, such as the user's arm, user's shoulder, user's chest, and so forth.

Figure 2:
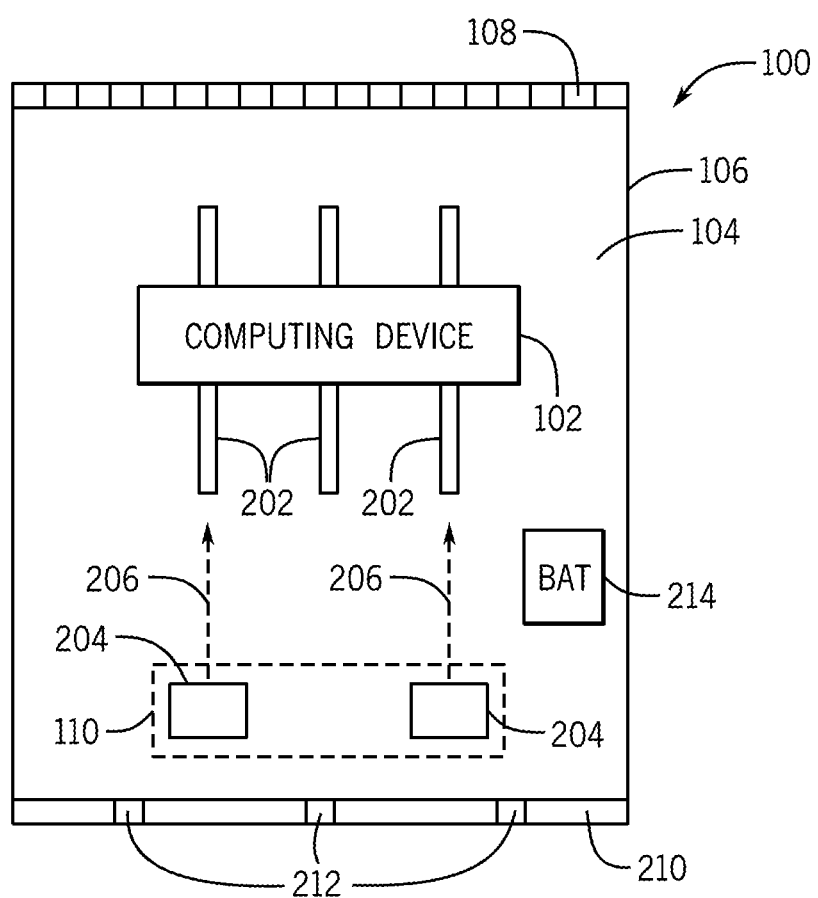
FIGS. 2-4 are schematic diagrams illustrating different wearable systems according to various examples.

FIG. 2 is a block diagram of the wearable system 100 according to further examples. The computing device 102 in the outer case 106 can be thermally contacted to thermal channels 202 that transport heat away from the computing device 102 along the lengths of the thermal channels 202. Although a specific number of thermal channels 202 are shown in FIG. 2, it is noted that in other examples, a different number of thermal channels 202 (one or greater than one) can be employed. The computing device 102 can be directly thermally contacted to the thermal channels 202, or indirectly through a thermally conductive layer (e.g., a thermal paste, a thermally conductive block, etc.) to the thermal channels 202.

In some examples, the thermal channels 202 can be formed using heat sinks. Alternatively, the thermal channels 202 can be formed using heat pipes, where a heat pipe refers to a conduit that contains a working fluid provided in a hermetically sealed inner chamber of the conduit. The working fluid in the conduit can be vaporized by heat generated by the computing device 102. The vaporized working fluid can be transported through a channel in the heat pipe to a cooler region of the heat pipe, where the vaporized working fluid is condensed into liquid form. The liquefied working fluid is then transported by capillary action using a wick structure inside the heat pipe back towards a hot region of the heat pipe that is adjacent the computing device 102.

In other examples, the thermal channels 202 can be formed using thermally conductive layers, such as metal foils or foils formed of other thermally conductive materials.

The airflow generator 110 of FIG. 2 includes multiple fans 204. Although a specific number of fans 204 are shown as being part of the airflow generator 110, it is noted that in other examples, a different number of fans 204 (e.g., one fan or more than two fans) can be employed.

The fans 204 produce an airflow 206 that is generally in the upward direction inside the inner chamber 104 of the outer case 106. The airflow 206 passes over the thermal channels 202 and the computing device 102. The heat generated by the computing device 102 and along the thermal channels 202 causes the airflow to be heated. The heated airflow is directed generally upwardly through the inner chamber 104 of the outer case 106 and exits through the exhaust portion 108 at the top side of the outer case 106.

The fans 204 draw air through an inlet portion 210 at the bottom side of the outer case 106 when worn by the user 112. Alternatively, the inlet portion 210 can be provided at another side of the outer case 106. The inlet portion 210 includes inlet openings 212 through which cool air can be drawn into the inner chamber 104 from the environment outside the outer case 106. In some examples, the inlet portion 210 can also be formed of a liquid resistant and breathable material that includes small pores. In such examples, the inlet openings 212 include the small pores. In other examples, the inlet portion 210 can be formed with larger inlet openings to allow air to be drawn by the fans 204 into the inner chamber 104 of the outer case 106.

In some examples, a battery 214 can also be contained in the inner chamber 104 of the outer case 106. The battery 214 can be used to power the computing device 102 and/or the airflow generator 110.

Figure 3:
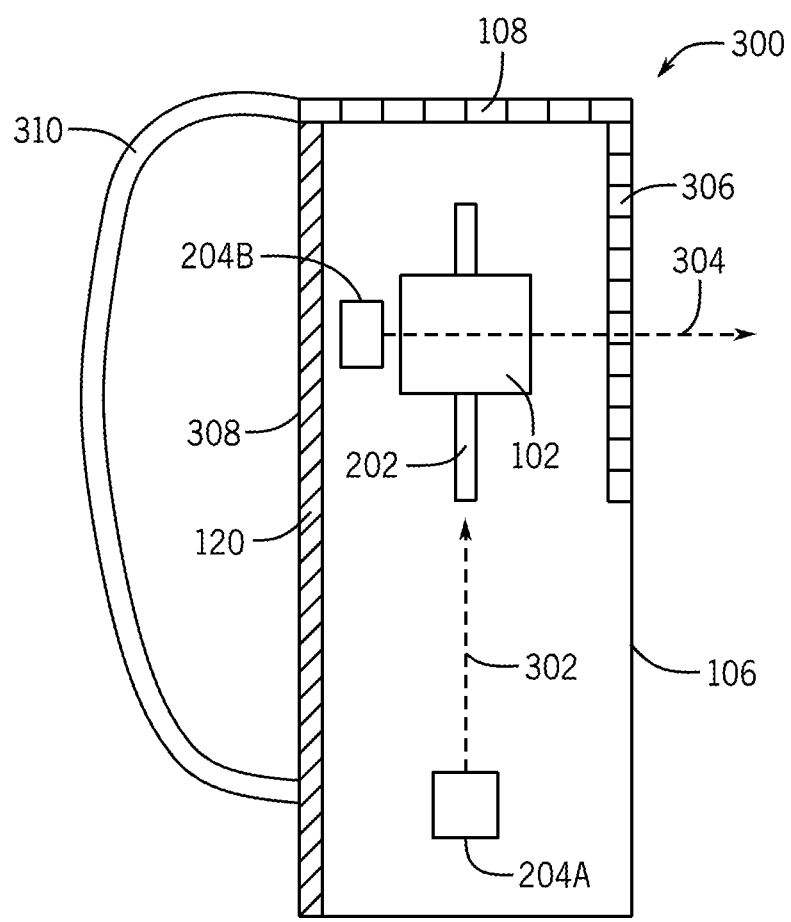

FIG. 3 is a block diagram of another example arrangement of a wearable system 300 according to further examples. FIG. 3 is a schematic side view of the wearable system 300, where the airflow generator of FIG. 3 includes fans 204A and 204B that direct airflows 302 and 304, respectively, in different directions. The fan 204A directs the airflow 302 generally upwardly, to exit through the exhaust portion 108 at the top side of the outer case 106. The fan 204B directs the airflow 304 in a generally lateral direction through another exhaust portion 306 at the front side of the outer case 106. The exhaust portion 306 can similarly include a liquid resistant and breathable layer that has small pores through which the airflow 304 can exit.

The outer case 106 has a back side 308 that is in contact with the user 112 when the wearable system 100 of FIG. 3 is worn by the user 112. The thermally reflective layer 120 is arranged adjacent the back side 308 of the outer case 106, to reflect heat generated by the computing device 102 away from the user 112.

A strap 310 (or multiple straps) can be attached to the outer case 106. The strap 310 can be used by the user 112 to secure the outer case 106 to the user 112.

Figure 4:
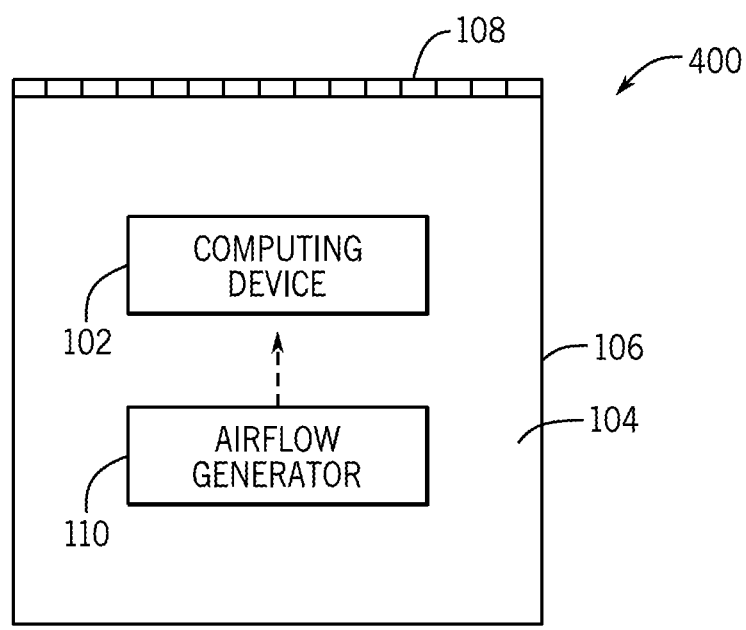

FIG. 4 is a simplified block diagram of a wearable system 400 according to some implementations. The wearable system 400 can be the wearable system 100 of FIGS. 1 and 2, or the wearable system 300 of FIG. 3, as examples. The wearable system 400 includes an outer case 106 that defines an inner chamber 104 and that includes a portion 108 that includes a liquid resistant and breathable layer. A computing device 102 is provided in the inner chamber 104. Also, an airflow generator 110 produces an airflow to cool the computing device 102 and to direct a resulting heated airflow to flow through pores of the liquid resistant and breathable layer to an environment outside the outer case 106.

Figure 5:
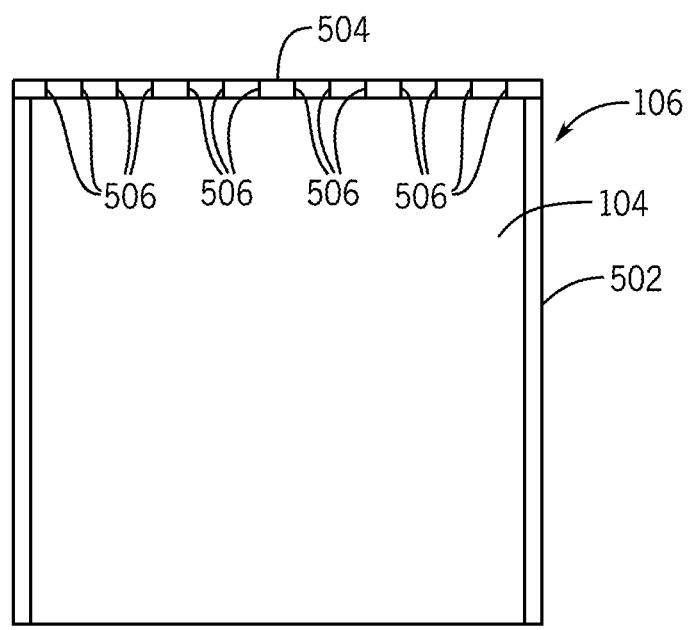
FIG. 5 is a schematic diagram of an outer case for a wearable system according to some examples.

FIG. 5 is a block diagram of a simplified view of the outer case 106 for a wearable system, such as any of wearable systems 100, 300, and 400 discussed above. The outer case 106 includes a main housing 502 that defines the inner chamber 104 to house a computing device and an airflow generator to produce an airflow inside the inner chamber 104. In addition, the outer case 106 includes a liquid resistant and breathable layer 504 attached (such as by an adhesive, stitching, over-molding, etc.) to the main housing 502 and including small pores 506. The small pores 506 prevent ingress of a liquid into the inner chamber 104 and provide an airflow outlet path through which a heated exhaust airflow heated by the computing device passes from the inner chamber 104 to an environment outside the outer case.

Figure 6:
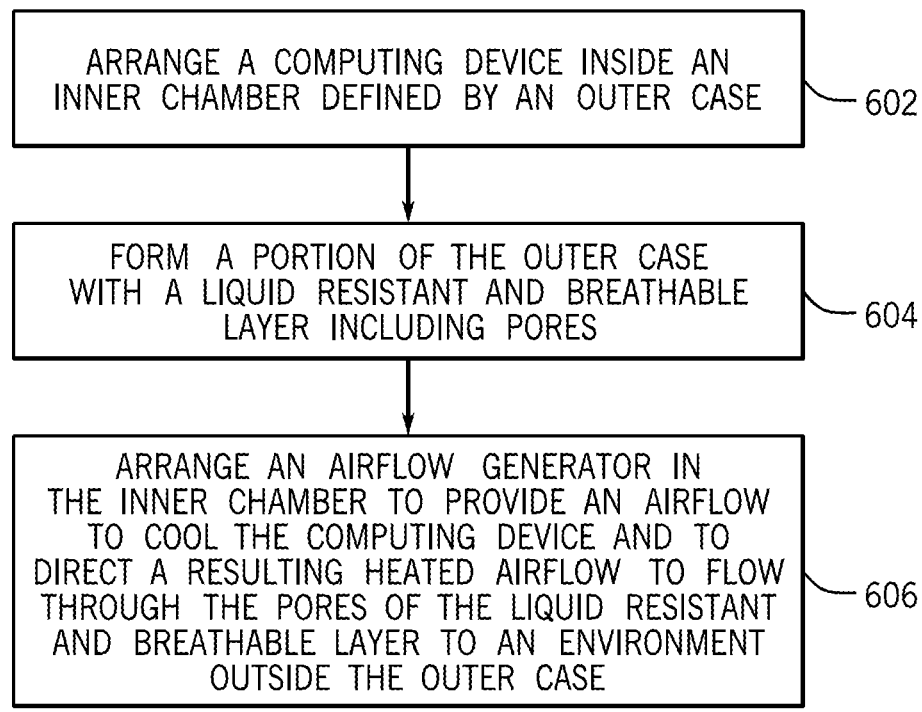
FIG. 6 is a flow diagram of a process of forming a wearable system according to some examples.

FIG. 6 is a flow diagram of an example process of forming a wearable system according to some examples. The process arranges (at 602) a computing device inside an inner chamber defined by an outer case, where the computing device is to communicate with an electronic device that is outside of the outer case. The process forms (at 604) a portion of the outer case with a liquid resistant and breathable layer including pores. The process arranges (at 606) an airflow generator in the inner chamber to produce an airflow to cool the computing device and to direct a resulting heated airflow to flow through the pores of the liquid resistant and breathable layer to an environment outside the outer case.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A wearable system comprising:
   an outer case defining an inner chamber and comprising a portion including a liquid resistant and breathable layer;
   a computing device in the inner chamber;
   an airflow generator to produce an airflow to cool the computing device and to direct a resulting heated airflow to flow through pores of the liquid resistant and breathable layer to an environment outside the outer case;
   a strap to secure the outer case to a user; and
   a thermally reflective layer arranged along a side of the outer case adjacent the user when the wearable system is worn by the user, the thermally reflective layer to reflect heat from the computing device away from the user.

2. The wearable system of claim 1, further comprising a body-mounted device that is outside of the outer case, the body-mounted device to communicate with the computing device and to display information generated by the computing device.

3. The wearable system of claim 2, wherein the body-mounted device is to communicate with the computing device over a wireless link or a wired link.

4. The wearable system of claim 1, further comprising a thermal channel thermally contacted to the computing device and to carry heat produced by the computing device away from the computing device, wherein the airflow is to pass over the thermal channel.

5. The wearable system of claim 4, wherein the thermal channel comprises a heat pipe.

6. The wearable system of claim 1, wherein the liquid resistant and breathable layer comprises a porous core layer.

7. The wearable system of claim 1, wherein the portion including the liquid resistant and breathable layer is at a first side of the outer case, wherein the outer case further comprises another portion at a second, different side of the outer case, the another portion including a liquid resistant and breathable layer, and wherein the heated airflow is to flow through the another portion to the environment outside the outer case.

8. The wearable system of claim 1, wherein the liquid resistant and breathable layer comprises a material selected from among an expanded polytetrafluoroethylene and a polymer.

9. The wearable system of claim 1, wherein the airflow generator is in the inner chamber, and the resulting heated airflow is heated by the computing device in the inner chamber, and the resulting heated airflow is to flow from the inner chamber through the pores of the liquid resistant and breathable layer to the environment outside the outer case.

10. The wearable system of claim 1, comprising a bag that includes the outer case, the computing device, and the airflow generator.

11. The wearable system of claim 1, comprising a backpack that includes the outer case, the computing device, and the airflow generator.

12. The wearable system of claim 1, wherein the pores of the liquid resistant and breathable layer allow airflow to exit from the inner chamber to the environment outside the outer case, and prevent liquid droplets from entering into the inner chamber from the environment outside the outer case.

13. The wearable system of claim 1, wherein the thermally reflective layer is to reflect infrared energy.

14. An outer case comprising:
   a housing providing an inner chamber to house a computing device and an airflow generator that produces an airflow inside the inner chamber to cool the computing device;
   a liquid resistant and breathable layer that is part of the housing and comprising pores that prevent ingress of liquid into the inner chamber and provide an airflow outlet path through which a heated exhaust airflow heated by the computing device passes to an environment outside the outer case; and
   a thermally reflective layer provided on a side of the outer case that is adjacent a user when the outer case is worn by the user, the thermally reflective layer to reflect heat from the computing device away from the user.

15. The outer case of claim 14, wherein the liquid resistant and breathable layer is provided at a first side of the outer case, and the outer case further comprises another liquid resistant and breathable layer provided at a second, different side of the outer case, the another liquid resistant and breathable layer comprising pores that prevent ingress of a liquid into the inner chamber and provide an airflow outlet path through which the heated exhaust airflow heated by the computing device passes to the environment outside the outer case.

16. The outer case of claim 14, further comprising:
   the airflow generator in the inner chamber,
   wherein the heated exhaust airflow is to pass from the inner chamber through the pores to the environment outside the outer case.

17. A method of forming a wearable system, comprising:
   arranging a computing device inside an inner chamber defined by an outer case, the computing device to communicate with an electronic device that is outside of the outer case;
   forming a portion of the outer case with a liquid resistant and breathable layer comprising pores; and
   arranging an airflow generator in the inner chamber to produce an airflow to cool the computing device and to direct a resulting heated airflow to flow through the pores of the liquid resistant and breathable layer to an environment outside the outer case.

18. The method of claim 17, wherein the pores of the liquid resistant and breathable layer allow airflow to exit from the inner chamber to the environment outside the outer case, and prevent liquid droplets from entering into the inner chamber from the environment outside the outer case.

19. The method of claim 17, further comprising:
   arranging a thermally reflective layer arranged along a side of the outer case adjacent a user when the wearable system is worn by the user, the thermally reflective layer to reflect heat from the computing device away from the user.

20. The method of claim 19, wherein the thermally reflective layer is to reflect infrared energy.

* * * * *